(12) United States Patent
Alvey

(10) Patent No.: US 7,734,037 B1
(45) Date of Patent: Jun. 8, 2010

(54) REMOTE TERMINAL UNIT CONNECTOR

(75) Inventor: Stephen L. Alvey, San Angelo, TX (US)

(73) Assignee: Verizon Services Corp., Ashburn, VA (US)

( * ) Notice: Subject to any disclaimer, the term of this patent is extended or adjusted under 35 U.S.C. 154(b) by 599 days.

(21) Appl. No.: 10/868,298

(22) Filed: Jun. 15, 2004

(51) Int. Cl.
*H04M 1/00* (2006.01)
*H04M 9/00* (2006.01)

(52) U.S. Cl. .................................. 379/413.02

(58) Field of Classification Search ................. 379/412, 379/413.02–413.04
See application file for complete search history.

(56) References Cited

U.S. PATENT DOCUMENTS

| | | | |
|---|---|---|---|
| 4,741,032 A | 4/1988 | Hampton | |
| 4,853,960 A * | 8/1989 | Smith | 379/437 |
| 4,979,209 A | 12/1990 | Collins et al. | |
| 5,207,583 A | 5/1993 | DeBalko et al. | |
| 5,404,401 A * | 4/1995 | Bliven et al. | 379/442 |
| 5,416,837 A | 5/1995 | Cote et al. | |
| 5,469,282 A * | 11/1995 | Ishioka | 398/25 |
| 5,479,505 A | 12/1995 | Butler et al. | |
| D366,456 S | 1/1996 | Rodriguez et al. | |
| 5,623,542 A | 4/1997 | Schneider et al. | |
| 5,832,078 A * | 11/1998 | Tuvy et al. | 379/413.04 |
| 5,883,941 A | 3/1999 | Akers | |
| 5,903,698 A | 5/1999 | Poremba et al. | |
| 5,917,814 A * | 6/1999 | Balatoni | 370/352 |
| 6,026,160 A * | 2/2000 | Staber et al. | 379/413.03 |
| 6,078,661 A * | 6/2000 | Arnett et al. | 379/413.04 |
| 6,118,766 A | 9/2000 | Akers | |
| 6,141,330 A | 10/2000 | Akers | |
| 6,556,638 B1 | 4/2003 | Blackburn | |
| 6,567,522 B1 | 5/2003 | Blackburn | |
| 6,628,992 B2 | 9/2003 | Osburn, III | |
| 6,654,460 B1 * | 11/2003 | Rodgers | 379/326 |
| 6,683,950 B1 | 1/2004 | Harwood et al. | |
| 2002/0147503 A1 | 10/2002 | Osburn, III | |
| 2002/0196739 A1 * | 12/2002 | Corrado et al. | 370/248 |
| 2003/0210747 A1 * | 11/2003 | Gundrum | 375/257 |

OTHER PUBLICATIONS

GoDigital Networks Corporate Overview printed from GoDigital website.
XCel-8 CarrierNode System and XCel-8 CarrierNode Line Powered Voice Carrier System printed from GoDigital website on Jan. 29, 2004.

* cited by examiner

*Primary Examiner*—Alexander Jamal

(57) ABSTRACT

A plug is inserted into the connection between a Remote Terminal Unit (RTU) and one or more a station protection modules. A first plug end is connected to the RTU by at least one first wire. At least one station protection module is connected to a second plug end by at least one second wire. The first plug end and the second plug end are capable of being connected to each other. A first housing contains at least the RTU and a second housing contains the at least one station protection module, wherein the first housing and the second housing are capable of being attached to each other. Replacing the RTU requires disconnecting the first and second plug ends and then connecting a third plug end to the second plug end wherein the third plug end is connected to a second RTU by at least one third wire.

15 Claims, 2 Drawing Sheets

REMOTE TERMINAL UNIT CONNECTOR

BACKGROUND

This invention relates to a system for connecting a Remote Terminal Unit (RTU) and a station protection unit that together comprise a carrier field unit, the system enabling a field technician to replace the RTU quickly and efficiently.

A station protection unit, also known as a customer terminal unit because it is the point at which service to a particular telecommunications customer or customers terminates, generally comprises either four or eight station protection modules. Present practice is for an RTU, which is the point of interface between a customer location and a telecommunications system, to be connected to the station protection modules by means of a wiring harness wherein wires from the RTU are connected by hand to each of the station protection modules. The process of connecting the wiring harness to the station protection modules is time consuming and error-prone.

Presently, when a field technician is required to replace an RTU, the technician must remove all of the wiring from the station protection modules in the station protection unit. Then, after removing the old RTU, the field technician must install a new RTU by connecting wires running from the new RTU to each of the station protection modules in the station protection unit. In addition to connecting the wires running from the new RTU, which can take thirty minutes or more, the field technician must test the new connections. Testing the new connections may require traveling to up to eight separate customer locations that may be separated by a distance measured in miles. If a connection is not properly established, then the field technician must repeat this time-consuming process.

Accordingly, a system that enables a field technician to replace an RTU in less than a minute, without having to test any of the connections to the RTU, would present significant advantages over present practice. In particular, the present invention offers the advantage of saving significant amounts of a field technician's time, and consequently also allows telecommunications providers to save significant amounts of repair and maintenance costs.

SUMMARY

A plug is inserted into the afore-mentioned connection between a Remote Terminal Unit (RTU) and a station protection unit. Thus, when a field technician is required to replace the RTU, the replacement can be accomplished without the field technician having to hand-wire the connection of the RTU to each of the station protection modules in the station protection unit.

The RTU comprises a first plug end connected to the RTU by at least one first wire and at least one station protection module having a second plug end connected to the at least one station protection module by at least one second wire, wherein the first plug end and the second plug end are capable of being connected to each other. A first housing contains at least the RTU and a second housing contains the at least one station protection module, wherein the first housing and the second housing are capable of being attached to each other.

A first RTU may be replaced by disconnecting from a first plug end a second plug end that is connected to the first plug end, wherein the first plug end is connected to at least one first wire and the at least one first wire is connected to the first RTU, and further wherein the second plug is connected to at least one second wire and the at least one second wire is connected to at least one station protection module. A third plug end may be connected to the second plug end wherein the third plug end is connected to a second RTU by at least one third wire. A first housing may be detached from a second housing wherein the first RTU is contained in the first housing and the at least one station protection module is contained in the second housing. A third housing may be attached to the second housing, wherein the third housing contains the second RTU.

DETAILED DESCRIPTION

Figure 1:
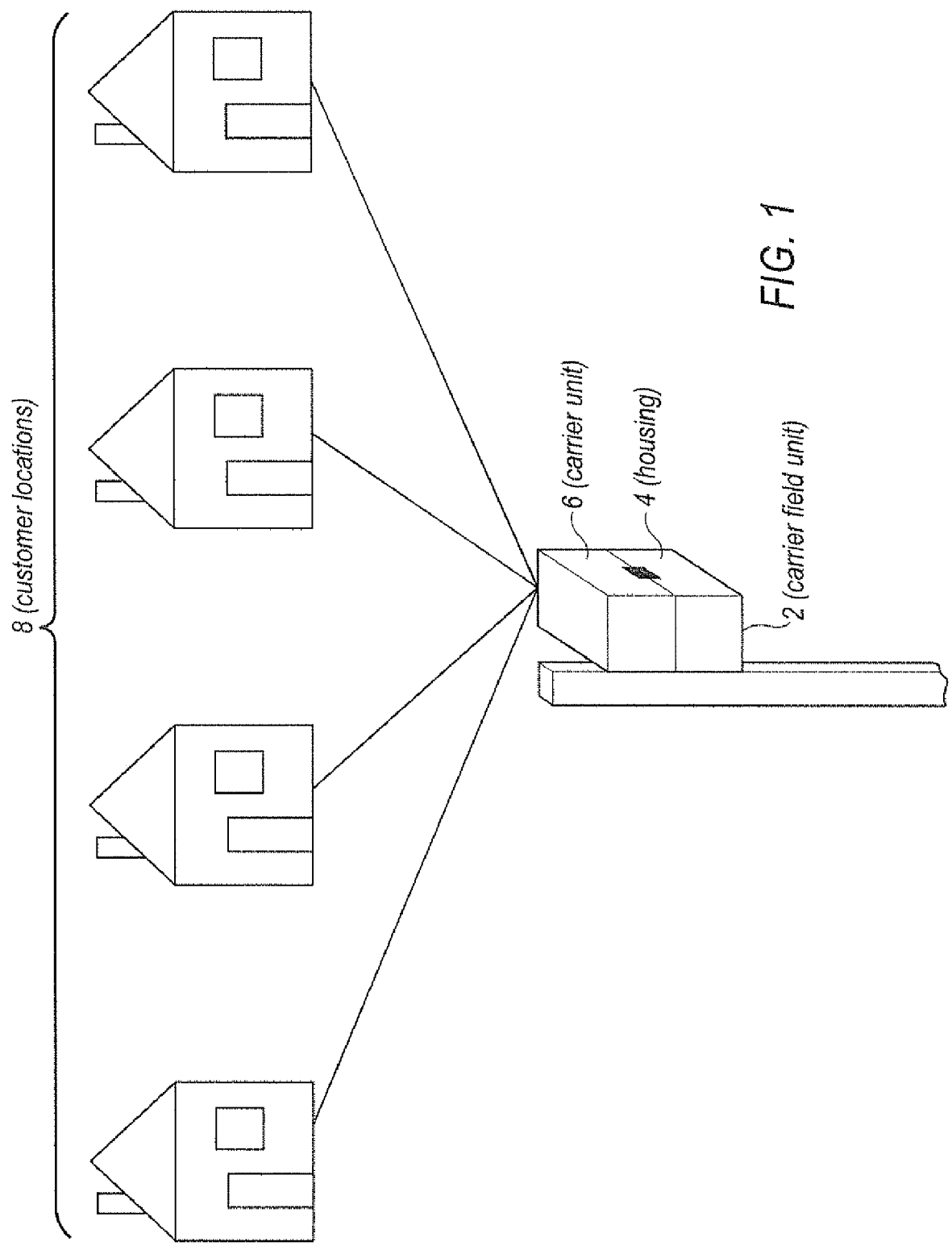
FIG. 1 shows a carrier field unit deployed to serve a plurality of customer locations.

With reference to FIG. 1, carrier field unit 2 may be located on a pole, on the side of a building, or at some similar location. Carrier field unit 2 comprises station protection unit housing 4 and lid mounted carrier unit 6. Carrier field unit 2 serves as the interface between a telecommunications system and customer locations 8. FIG. 1 depicts four customer locations 8, but carrier field unit 2 may also connect to eight customer locations 8. Each of customer locations 8 may be located many yards, if not miles, apart from one another and carrier field unit 2. Thus, it should be clear that testing connections to different customer locations 8 served from the same carrier field unit 2 is likely both inconvenient and time consuming for a field technician assigned to service carrier field unit 2.

Figure 2:
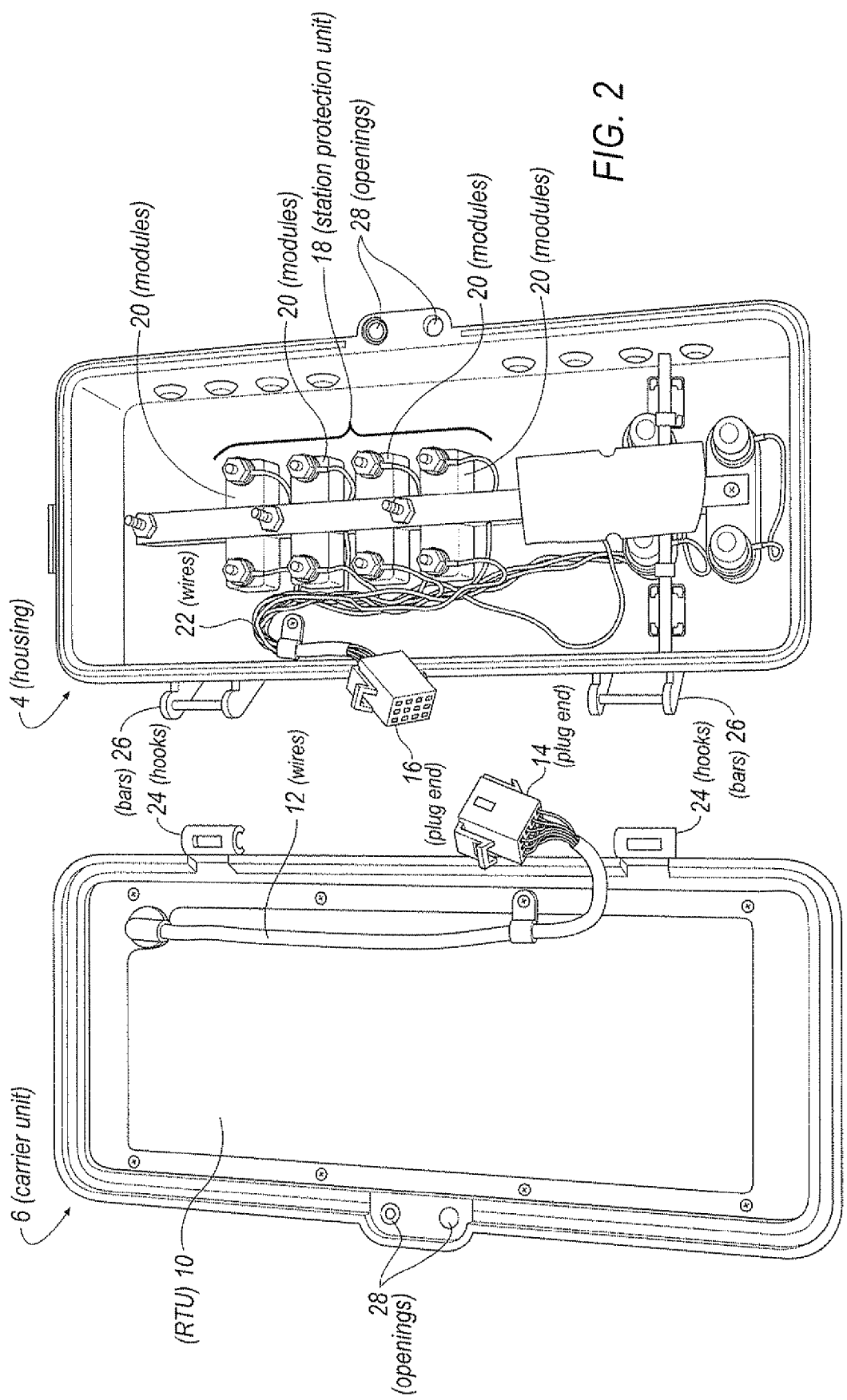
FIG. 2 shows a lid mounted carrier unit containing an RTU connected by a twelve-pin plug to a station protection unit containing station protection modules.

With reference to FIG. 2, lid mounted carrier unit 6 comprises a housing that contains RTU 10. In a preferred embodiment, RTU 10 is the XCel-8 CarrierNode manufactured by GoDigital Networks Corporation of Fremont, Calif. RTU wires 12 are connected to RTU 10 and terminate in plug end 14, which is connectable to plug end 16. In some embodiments plug end 14 and plug end 16 are reciprocal parts of a standard twelve-pin plug such as will be known to those skilled in the art and such as may be purchased at many electronics supply stores.

Station protection unit housing 4 contains station protection unit 18. Those skilled in the art will recognize that station protection unit 18 may also be referred to as a customer unit or as a customer terminal unit. Station protection unit 18 comprises station protection modules 20. Those skilled in the art will recognize that each of station protection modules 20 serves as a terminal point for one of the customer locations 8 that are depicted in FIG. 1. FIG. 2 depicts four station protection modules 20, but in some embodiments station protection unit 18 comprises eight station protection modules 20. Station protection wires 22 are connected to station protection modules 20, and terminate in plug end 16, which is connectable to plug end 14.

Lid mounted carrier unit 6 generally comprises hooks 24 that grasp bars 26 attached to station protection unit housing 4, thereby forming a hinge allowing lid mounted carrier unit 6 to be opened and closed over station protection unit housing 4. By inserting screws, bolts, or other fasteners through openings 28, carrier field unit 2 can be securely closed and easily opened. Accordingly, when RTU 10 fails, lid mounted carrier unit 6 can be easily opened and removed from station protection unit housing 4 after plug end 14 is detached from plug end 16. Replacing RTU 10 requires simply connecting plug end 14 to plug end 16, and putting the new lid mounted carrier unit 6 in place atop station protection unit housing 4.

Certain advantages of the present invention can be seen by noting that the present invention obviates the need for the time intensive and error-prone process of hand-wiring each of station protection wires 22 to respective station protection modules 20. Advantages of the present invention can further be seen by noting that the present invention obviates the need for the time intensive process of visiting each of customer locations 8 in order to test the connection of RTU 10 to each of station protection modules.

The above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the field of connecting RTUs to station protection units and that the disclosed apparatus, systems and methods will be incorporated into such future embodiments. Accordingly, it will be understood that the invention is capable of modification and variation and is limited only by the following claims.

I claim:

1. A system, comprising:
  a lid that includes a first housing containing a remote terminal unit, the lid and the remote terminal unit thereby forming a single unit, the remote terminal unit having a first plug end connected to the remote terminal unit by a plurality of first wires;
  a second housing that includes a second plug end and that is capable of a connection to the lid, the second housing and the lid being capable of being in an open position or a closed position while connected;
  a plurality of station protection modules included within the second housing that are each connected to one of a plurality of second wires, the second wires also being connected to the second plug end; and
  wherein the first plug end and the second plug end are capable of being connected to each other.

2. A method comprising:
  opening a lid including a first housing, the lid being connected to a second housing before and after the lid is opened, the first housing containing a remote terminal unit, the lid and the remote terminal unit thereby forming a single unit, the remote terminal unit having a first plug end connected to the remote terminal unit by a plurality of first wires, and the second housing including a plurality of station protection modules that are each connected to one of a plurality of second wires, the second wires also being connected to a second plug end, the first plug end being connected to the second plug end; and
  after opening the lid, disconnecting the first plug end from the second plug end,
  wherein the first plug end is connected to a plurality of first wires, first wires also being connected to the remote terminal unit,
  and further wherein the second plug end is connected to a plurality of second wires, each of the second wires being also connected to one of the plurality of station protection modules.

3. The method of claim 2, further comprising:
  connecting a third plug end to the second plug end wherein the third plug end is connected to a second remote terminal unit by at least one third wire.

4. The method of claim 3, further comprising disconnecting the lid from the second housing.

5. The method of claim 4, further comprising attaching a second lid to the second housing, wherein the second lid contains the second remote terminal unit.

6. The method of claim 3, wherein the at least one third wire is a plurality of third wires.

7. The system of claim 1, wherein the first plug end and the second plug end are reciprocal parts of a plug including a plurality of pins.

8. The method of claim 2, wherein the first plug end and the second plug end are reciprocal parts of a plug including a plurality of pins.

9. The system of claim 1, wherein the connection forms a hinge.

10. The system of claim 1, wherein the first plug end and the second plug end are capable of being connected to each other both when the second housing and the lid are connected and when the second housing and the lid are unconnected.

11. The system of claim 1, wherein the first plug end and the second plug end are included within an enclosure formed by the second housing and the lid when the second housing and the lid are in the closed position.

12. The method of claim 2, wherein the lid and the second housing are connected by a hinge.

13. The method of claim 2, further comprising disconnecting the lid from the second housing.

14. The method of claim 13, wherein disconnecting the lid from the second housing is performed prior to disconnecting the first plug end from the second plug end.

15. A system, comprising:
  a lid that includes a first housing containing a remote terminal unit, the lid and the remote terminal unit thereby forming a single unit, the remote terminal unit having a first plug end connected to the remote terminal unit by a plurality of first wires;
  a second housing that includes a second plug end and that is capable of a connection to the lid, the second housing and the lid being capable of being in an open position or a closed position while connected;
  a plurality of station protection modules included within the second housing that are each connected to one of a plurality of second wires, the second wires also being connected to the second plug end; and
  wherein the first plug end and the second plug end are capable of being connected to each other; and
  further wherein the first plug end and the second plug end are included within an enclosure formed by the second housing and the lid when the second housing and the lid are in the closed position.

* * * * *